United States Patent
Klipper et al.

(10) Patent No.: US 9,834,653 B2
(45) Date of Patent: Dec. 5, 2017

(54) METHOD FOR PRODUCING MONODISPERSE, AMIDO-METHYLATED VINYL-AROMATIC BEAD POLYMERS

(71) Applicant: LANXESS Deutschland GmbH, Cologne (DE)

(72) Inventors: Reinhold Klipper, Cologne (DE); Wolfgang Zarges, Cologne (DE); Olaf Halle, Cologne (DE); Michael Schelhaas, Cologne (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 14/906,308

(22) PCT Filed: Aug. 8, 2014

(86) PCT No.: PCT/EP2014/067109
§ 371 (c)(1),
(2) Date: Jan. 20, 2016

(87) PCT Pub. No.: WO2015/018931
PCT Pub. Date: Feb. 12, 2015

(65) Prior Publication Data
US 2016/0200887 A1 Jul. 14, 2016

(30) Foreign Application Priority Data
Aug. 9, 2013 (EP) .................................... 13179835

(51) Int. Cl.
| | |
|---|---|
| *C08F 8/32* | (2006.01) |
| *C08J 7/12* | (2006.01) |
| *B01D 15/36* | (2006.01) |
| *B01D 19/00* | (2006.01) |
| *C08J 5/20* | (2006.01) |
| *C10G 31/00* | (2006.01) |
| *C10L 3/10* | (2006.01) |
| *B01J 45/00* | (2006.01) |
| *C08F 212/14* | (2006.01) |
| *B01J 41/14* | (2006.01) |
| *C02F 1/42* | (2006.01) |
| *C08F 8/02* | (2006.01) |
| *C02F 101/20* | (2006.01) |

(52) U.S. Cl.
CPC .............. *C08J 7/12* (2013.01); *B01D 15/361* (2013.01); *B01D 19/0005* (2013.01); *B01J 41/14* (2013.01); *B01J 45/00* (2013.01); *C02F 1/42* (2013.01); *C08F 8/02* (2013.01); *C08F 212/14* (2013.01); *C08J 5/20* (2013.01); *C10G 31/00* (2013.01); *C10L 3/101* (2013.01); *C02F 2001/422* (2013.01); *C02F 2001/425* (2013.01); *C02F 2101/20* (2013.01); *C08J 2325/08* (2013.01); *C10L 2290/54* (2013.01)

(58) Field of Classification Search
USPC .......................................................... 521/32
See application file for complete search history.

(56) References Cited

U.S. PATENT DOCUMENTS

| | | | | |
|---|---|---|---|---|
| 4,157,993 | A * | 6/1979 | Funabiki | B22C 1/2253 523/145 |
| 4,232,125 | A | 11/1980 | Buske | |
| 4,252,700 | A * | 2/1981 | Funabiki | B22C 1/2253 164/521 |
| 4,419,245 | A | 12/1983 | Barrett et al. | |
| 4,427,794 | A | 1/1984 | Lange et al. | |
| 4,444,961 | A | 4/1984 | Timm | |
| 5,231,115 | A | 7/1993 | Harris | |
| 6,649,663 | B1 * | 11/2003 | Klipper | B01J 45/00 521/30 |
| 7,053,129 | B1 * | 5/2006 | Klipper | B01J 39/04 521/32 |
| 7,077,964 | B2 * | 7/2006 | Klipper | B01J 45/00 210/688 |
| 2008/0087604 | A1 * | 4/2008 | Vanhoorne | B01J 41/14 210/660 |
| 2008/0229882 | A1 | 9/2008 | Halle et al. | |
| 2009/0107918 | A1 * | 4/2009 | Klipper | B01J 43/00 210/660 |
| 2010/0307979 | A1 * | 12/2010 | Klipper | B01D 53/64 210/688 |
| 2011/0086935 | A1 * | 4/2011 | Schelhaas | B01J 45/00 521/183 |

OTHER PUBLICATIONS

Von Einum Autorenkollertiv, Organikum, Organisch Chemisches Grundpraktikum, 8, unveranderte Auflage, Veb Deutscher Verlag Der Wissenschaften, Berlin, Germany, 1968, pp. 479, 481.
International Search Report from International Application No. PCT/EP201/067109, dated Sep. 16, 2014, two pages.

* cited by examiner

*Primary Examiner* — Mark Kaucher
*Assistant Examiner* — Henry Hu

(57) ABSTRACT

The invention relates to a method of producing monodisperse amidomethylated vinylaromatic bead polymers, to ion exchangers prepared from these monodisperse amidomethylated vinylaromatic bead polymers by alkaline hydrolysis, to the method of using said monodisperse amidomethylated vinylaromatic bead polymers in the manufacture of ion exchangers and chelating resins, and also to the method of using these ion exchangers in the removal of heavy metals and noble metals from aqueous solutions or gases.

11 Claims, No Drawings

METHOD FOR PRODUCING MONODISPERSE, AMIDO-METHYLATED VINYL-AROMATIC BEAD POLYMERS

The invention relates to a method of producing monodisperse amidomethylated vinylaromatic bead polymers, to ion exchangers prepared from these monodisperse amidomethylated vinylaromatic bead polymers by alkaline hydrolysis, to the method of using said monodisperse amidomethylated vinylaromatic bead polymers in the manufacture of ion exchangers and chelating resins, and also to the method of using these ion exchangers in the removal of heavy metals and noble metals from aqueous solutions or gases.

Monodisperse amidomethylated vinylaromatic bead polymers are important intermediates in the synthesis of ion exchangers and chelating resins. Methods of producing monodisperse phthalimidomethylated vinylaromatic bead polymers are known from U.S. Pat. No. 6,649,663 B1 and U.S. Pat. No. 7,053,129 B1. The initial step in either method comprises forming N methylolphthalimide which, in a further step, is converted into bis(phthalimdomethyl) ether by acid catalysis. The bis(phthalimidomethyl) ether is then converted in a third step into its $SO_3$ adduct which is reacted with monodisperse bead polymers to form the monodisperse phthalmidomethylated vinylaromatic bead polymer. The disadvantage with either method is the large number of reaction steps, the equipment intensity and the need for time-intensive supervision, making them ecologically and economically inefficient.

The problem addressed by the present invention was therefore that of providing a method that overcomes the disadvantages of the prior art and provides monodisperse vinylaromatic bead polymers in an efficient manner.

It has now been found that, surprisingly, the reaction of monodisperse vinylaromatic bead polymers with condensed formaldehydes and protic acids will proceed under suitable reaction conditions to give monodisperse amidomethylated vinylaromatic bead polymers in high yields.

The present invention accordingly provides a method of producing monodisperse amidomethylated vinylaromatic bead polymers that comprises reacting at least one monodisperse vinylaromatic bead polymer with at least one compound of formula (I) or salts thereof

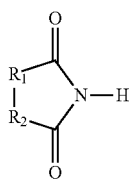

(I)

where $R_1$=—CH—($C_1$-$C_6$-alkyl) or —$CH_2$— and $R_2$=—CH—($C_1$-$C_6$-alkyl) or —$CH_2$— or $R_1$ and $R_2$ combine to form an optionally $C_1$-$C_6$-alkyl-substituted $C_6$-$C_{14}$-aryl, or $R_1$ and $R_2$ each represent —CH=, and at least one condensed formaldehyde in the presence of at least one protic acid and in the presence of at least one organic solvent at a temperature between 55° C. and 75° C.

$R_1$ and $R_2$ preferably combine to form a $C_1$-$C_4$-alkyl-substituted $C_6$-$C_{16}$-aryl. $R_1$ and $R_2$ more preferably combine to form phenyl, which is optionally substituted by $C_1$-$C_4$-alkyl. It is very particularly preferable for compounds of formula (I) to be phthalimide, succinimide or maleimide. It is yet more preferable for the compound of formula (I) to be phthalimide. When phthalimide is used, the invention provides phthalamidomethylated bead polymers. References to the salts of the compounds of formula (I) are to be understood as meaning in general acid addition products of organic or inorganic acids with compounds of formula (I), e.g., chloride, sulfate, sulfite, phosphate, phosphite, acetate, oxalate, tartrate, formate or citrate. Any salts employed are preferably the chlorides or sulfates of the compounds of formula (I).

$C_1$-$C_6$-Alkyl and $C_1$-$C_4$-alkyl for the purposes of the invention represent a straight-chain, cyclic, branched or unbranched alkyl moiety having respectively 1 to 6 and 1 to 4 carbon atoms. $C_1$-$C_6$-Alkyl illustratively and preferably represents methyl, ethyl, n-propyl, isopropyl, n-butyl, i-butyl, s-butyl, t-butyl, cyclopropyl, n-propyl, 1-methylbutyl.

$C_1$-$C_4$-Alkyl illustratively and preferably represents methyl, ethyl, n-propyl and isopropyl.

$C_6$-$C_{14}$-Aryl for the purposes of the invention represents a mono-, bi- or tricyclic carbocyclic aromatic moiety having 6 to 14 aromatic carbon atoms. $C_6$-$C_{14}$-Aryl illustratively and preferably represents biphenyl, phenyl, naphthyl or fluorenyl, phenathrenyl, anthracenyl.

$C_6$-$C_{14}$-Aryl more preferably represents phenyl.

Condensed formaldehyde is to be understood as meaning condensates of formaldehyde. Compounds of this type are prepared by customary methods known to a person skilled in the art. Compounds employed as condensed formaldehydes include, for example, those of formula (II)

$$HO\!-\!\!\left[CH_2\!-\!O\right]_n\!\!-\!H \qquad (II)$$

where n is =8 to 100. Preference is given to employing compounds of formula (II) where n is =8 to 15.

But it is also possible to employ cyclic condensates such as, for example, trioxane. It is particularly preferable for paraformaldehyde or trioxane or mixtures thereof to be employed as condensed formaldehyde. It is very particularly preferable to employ paraformaldehyde as condensed formaldehyde.

The organic solvents are specifically swellants for the bead polymers, but likewise serve as solvents in respect of the other reactants involved in the amidation reaction. Organic solvents employed for the purposes of the invention are inert solvents capable of swelling the bead polymers and at the same time of acting as solvents for the further reactants. Employable organic solvents include, for example, chlorinated hydrocarbons, e.g., dichloroethane, dichloropropane, methylene chloride, carbon tetrachloride, trichloroethane, chlorobenzene, dichlorobenzene, for example nitro-substituted hydrocarbons, e.g., nitropropane, nitrobenzene, for example cyclic hydrocarbons, e.g., cyclohexane and methylcyclohexane. Preference for employment as organic solvents is given to chlorinated aliphatic hydrocarbons, in particular chlorinated $C_1$-$C_6$-alkanes, nitro-substituted hydrocarbons and cyclic aliphatic hydrocarbons. Particular preference for employment as organic solvents is given to dichloroethane, dichloropropane, methylene chloride, carbon tetrachloride, trichloroethane, chlorobenzene, dichlorobenzene, nitropropane, nitrobenzene, cyclohexane, methanesulfonic acid and methylcyclohexane. 1,2-Dichloroethane is employed with very particular preference as organic solvent. Protic acids used may, for example, be inorganic or organic protic acids. Inorganic protic acids used are, for example, hydrochloric acid, sulfuric acid, oleum, nitric acid, nitrous acid, sulfurous acid or phosphoric acid. Useful organic protic acids include, for example, oxalic acid, acetic acid or formic acid. Preference is given to using inorganic protic acids. Protic acids used are more preferably sulfuric acid, hydrochloric acid or oleum.

The monodisperse bead polymer is obtainable by the methods known from the literature. Such methods are described for example in U.S. Pat. No. A 4,444,961, EP A 0 046 535, U.S. Pat. No. A 4,419,245 or WO 93/12167.

Bead polymers for the purposes of the present invention are spherical crosslinked chain growth addition polymers. Vinylaromatic as used herein comprehends polyvinylaromatic and monovinylaromatic monomers.

The monodisperse vinylaromatic bead polymers are prepared employing for example at least one monovinylaromatic compound and at least one polyvinylaromatic compound. However, it is also possible to use mixtures of two or more monovinylaromatic compounds or mixtures of two or more polyvinylaromatic compounds. Preference for preparing the monodisperse vinylaromatic bead polymers is given to employing at least one monovinylaromatic compound and at least one polyvinylaromatic compound.

Monovinylaromatic compounds employed for the purposes of the present Invention are preferably monoethylenically unsaturated compounds, for example styrene, vinyltoluene, ethylstyrene, α-methylstyrene, chlorostyrene, chloromethylstyrene, alkyl acrylates and alkyl methacrylates.

Particular preference is given to employing styrene or mixtures of styrene with the aforementioned monomers.

Preferred polyvinylaromatic compounds for the purposes of the present invention are multifunctional ethylenically unsaturated compounds, for example divinylbenzene, divinyltoluene, trivinylbenzene, divinylnaphthalene, trivinylnaphthalene, 1,7-octadiene, 1,5-hexadiene, ethylene glycol dimethacrylate, trimethylolpropane trimethacrylate or allyl methacrylate.

The polyvinylaromatic compounds are generally employed in amounts of 1-20 wt %, preferably 2-12 wt %, more preferably 4-10 wt %, based on the monomer or its mixture with further monomers. The type of polyvinylaromatic compound (crosslinker) is selected with a view to the later use of the bead polymer. Divinylbenzene is suitable in many cases. Commercial divinylbenzene grades which, in addition to the isomers of divinylbenzene, also contain ethylvinylbenzene are sufficient for most applications.

A preferred embodiment of the present invention employs microencapsulated monomer droplets.

Possible materials for the microencapsulation of monomer droplets are those known for employment as complex coacervates, in particular polyesters, natural and synthetic polyamides, polyurethanes, polyureas.

Gelatin for example is very useful as natural polyamide. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to acrylic acid and acrylamide. Gelatin-containing capsules can be hardened with conventional hardeners, for example formaldehyde or glutaraldehyde. The encapsulation of monomer droplests with gelatin, gelatin-containing coacervates and gelatin-containing complex coacervates is extensively described in EP A 0 046 535. The methods for encapsulation with synthetic polymers are known. An example of a very useful method is that of phase interface condensation where a reactive component, for example an isocyanate or an acyl chloride, dissolved in monomer droplets is made to react with a second reactive component, for example an amine, dissolved in the aqueous phase.

The optionally microencapsulated monomer droplets optionally contain an initiator or mixtures of initiators to induce the polymerization. Useful initiators for the method of the present invention include, for example, peroxy compounds such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyrontrile).

The initiators are generally applied in amounts of 0.05 to 2.5 wt %, preferably 0.1 to 1.5 wt %, based on the monomer mixture.

Porogens may optionally be further used in the optionally microencapsulated monomer droplets in order to generate a macroporous structure in the bead polymer. Useful porogens include organic solvents that are coagulants for polymers in that they are poor solvents and/or swellants for the polymer formed. Examples are hexane, octane, isooctane, isododecane, methyl ethyl ketone, butanol or octanol and isomers thereof.

The terms microporous or gellike/macroporous are already extensively described in the technical literature.

Preferred bead polymers for the purposes of the present invention have a macroporous structure.

The optionally microencapsulated monomer droplets may optionally also contain up to 30 wt % (based on the monomer) of crosslinked or uncrosslinked polymer. Preferred polymers derive from the aforementioned monomers, more preferably from styrene.

Monodisperse is to be understood for the purposes of the invention as meaning that at least 90% by volume or mass of the particles have a diameter located in an interval centered on the modal diameter and having a width amounting to ±10% of the modal diameter.

There are, for example, resin spherules where the size interval within which at least 90% by volume or mass are located is between 0.45 mm and 0.55 mm when the modal diameter is 0.5 mm and between 0.77 mm and 0.63 mm when the modal diameter is 0.7 mm.

The aqueous phase involved in preparing the monodisperse vinylaromatic bead polymers may optionally contain a dissolved polymerization inhibitor. Preferably, the aqueous phase does contain a dissolved polymerization Inhibitor. Both organic and inorganic inhibitors are useful for the purposes of the present invention. Examples of inorganic inhibitors are nitrogen compounds such as hydroxylamine, hydrazine, sodium nitrite and potassium nitrite, salts of phosphorous acid such as sodium hydrogenphosphite and also sulfurous compounds such as sodium dithionite, sodium thiosulfate, sodium sulfite, sodium bisulfite, sodium thiocyanate and ammonium thiocyanate. Examples of organic inhibitors are phenolic compounds such as hydroquinone, hydroquinone monomethyl ether, resorcinol, pyrocatechol, tert-butylpyrocatechol, pyrogallol and condensation products of phenols with aldehydes. Useful organic inhibitors further include nitrogenous compounds. These include hydroxylamine derivatives such as, for example, N,N-diethylhydroxylamine, N-isopropylhydroxylamine and also sulfonated or carboxylated N-alkylhydroxylamine or N,N-dialkylhydroxylamine derivatives, hydrazine derivatives such as, for example, N,N-hydrazinodiacetic acid, nitroso compounds such as, for example, N-nitrosophenylhydroxylamine, N-nitrosophenylhydroxylamine ammonium salt or N-nitrosophenylhydroxylamine aluminum salt. The concentration of the inhibitor is 5-1000 ppm based on the aqueous phase, preferably 10-500 ppm, more preferably 10-250 ppm.

The polymerization of the optionally microencapsulated monomer droplets to form the monodisperse vinylaromatic bead polymer is optionally carried out, as already mentioned above, in the presence of one or more protective colloids in the aqueous phase. Useful protective colloids include natural or synthetic water-soluble polymers, for example, gelatin, starch, polyvinyl alcohol, polyvinylpyrrolidone, polyacrylic acid, polymethacrylic acid or copolymers formed from (meth)acrylic acid and from (meth)acrylic esters. Very useful protective colloids further include cellulose derivatives, in particular cellulose esters and cellulose ethers, such as carboxymethylcellulose, methylhydroxyethylcellulose, methylhydroxypropylcellulose and hydroxyethylcellulose. Gelatin is particularly useful. The amount of protective colloids used is generally in the range from 0.05 to 1 wt % based on the aqueous phase, preferably from 0.05 to 0.5 wt %.

The polymerization to form the monodisperse vinylaromatic bead polymer may optionally also be carried out in the presence of a buffer system. Preferred buffer systems establish the pH of the aqueous phase at the start of the polymerization at a value between 14 and 6, preferably between 12 and 8. Under these conditions, protective colloids having carboxylic acid groups are wholly or partly present as salts. This causes a favourable effect on the action of the protective colloids. Particularly suitable buffer systems contain phosphate or borate salts. The terms "phosphate" and "borate" in the context of the invention also encompass the condensation products of the ortho forms of corresponding acids and salts. The concentration of the phosphate/borate in the aqueous phase is 0.5-500 mmol/l, preferably 2.5-100 mmol/l.

Stirrer speed is less critical in the polymerization and, in contradistinction to conventional bead polymerization, has no influence on particle size. Low stirrer speeds are employed, these being sufficient to keep the suspended monomer droplets in suspension and to promote the removal of the heat of polymerization. For this task, it is possible to use various stirrer types. Particularly suitable stirrers are gate stirrers having axial action.

The volume ratio of encapsulated monomer droplets to aqueous phase is from 1:0.75 to 1:20, preferably 1:1 to 1:6.

The polymerization temperature depends on the fragmentation temperature of the Initiator employed. It is generally between 50 to 180° C., preferably between 55 and 130° C. The polymerization takes from 0.5 to several hours. It has been found to be useful to employ a temperature program in which the polymerization is commenced at low temperature, for example 60° C., and the reaction temperature is raised with increasing polymerization conversion. In this way, for example, the requirement for reliable running of the reaction and high polymerization conversion can be fulfilled very efficiently. After polymerization, the polymer is isolated using customary procedures, for example by filtration or decanting, and optionally washed.

In a further step, the monodisperse vinylaromatic bead polymer is reacted with at least one compound of the formula (I), at least one condensed formaldehyde in the presence of at least one organic solvent and in the presence of at least one protic acid to form the monodisperse amidomethylated vinylaromatic bead polymer.

For example, the monodisperse vinylaromatic bead polymer may initially be swelled and mixed in this state with a mixture formed from the compounds of formula (I), from the condensed formaldehyde and from the protic acids. Similarly, however, the compounds of formula (I) could initially be added to the monodisperse crosslinked bead polymers in the presence of the organic solvents followed by the addition of the condensed formaldehyde and then of the protic acids. Preferably, the monodisperse crosslinked bead polymer is initially swelled in the presence of the organic solvent, and then the compounds of formula (I) or the condensed formaldehyde are added and then the protic acid is added. The organic solvents are preferably removed by distillation. The reaction products are worked up by processes known to those skilled in the art. Preferably, the reaction mixture is heated. The reaction is preferably carried out as a one-pot reaction.

The amount-of-substance ratio of the organic solvents to the compounds of formula (I) is generally in the range from 4.5:1 to 10:1. The amount-of-substance ratio of the organic solvents to the compounds of formula (I) is preferably in the range from 5:1 to 9:1. The amount-of-substance ratio of the organic solvents to the compounds of formula (I) s more preferably in the range from 5.5:1 to 8.5:1. The amount-of-substance ratio of the organic solvents to the compounds of formula (I) is most preferably in the range from 5.5:1 to 7.5:1.

The amount-of-substance ratio of the aromatic groups in the monodisperse vinylaromatic bead polymer to the compounds of formula (I) is for example in the range from 0.2:1 to 2.5:1. The amount-of-substance ratio of the aromatic groups in the monodisperse vinylaromatic bead polymer to the compounds of formula (I) is preferably in the range from 0.5:1 to 1.8:1.

The amount-of-substance ratio of compounds of formula (I) to condensed formaldehyde is for example in the range from 0.7:1 to 1.3:1. The amount-of-substance ratio of compounds of formula (I) to condensed formaldehyde is preferably in the range from 0.95:1 to 1.1:1.

The amount-of-substance ratio of the compounds of formula (I) to the protic acid employed is in the range from 1:1 to 1:3. The amount-of-substance ratio of the compounds of formula (I) to the protic acid employed is preferably in the range from 1:1.7 to 1:2.5.

The reaction temperature for the conversion of the monodisperse vinylaromatic bead polymers into the monodisperse vinylaromatic amidomethylated bead polymers is between 55° C. and 75° C. The reaction temperature for the conversion of the monodisperse vinylaromatic bead polymers into the monodisperse vinylaromatic amidomethylated bead polymers is most preferably in the range from 62° C. to 68° C.

The reaction is normally carried out under atmospheric pressure.

A particularly high yield of amidomethylated bead polymers is attainable in particular in the reaction of monodisperse vinylaromatic bead polymers with paraformaldehyde in the presence of 1,2-dichloroethane at a reaction temperature of 55° C. to 75° C. and at an amount-of-substance ratio for compounds of formula (I) to 1,2-dichloroethane in the range from 5.5:1 to 8.5:1. A particularly high yield of amidomethytated bead polymers is attainable in particular when employing phthalimide as compound of formula (I).

The monodisperse amidomethylated vinylaromatic bead polymers are in particular significant intermediates for the production of ion exchangers and chelating resins. It is thus possible, for instance, to prepare ion exchangers, in particular anion exchangers, and chelating resins from the monodisperse amidomethylated vinylaromatic bead polymers obtained by the method of the present invention.

The monodisperse amidomethylated vinylaromatic bead polymer obtained according to the present invention is likewise co-encompassed by the invention.

The monodisperse vinylaromatic amidomethylated bead polymer is then convertible in a further step into monodisperse vinylaromatic aminomethylated bead polymers. Preferably, the monodisperse vinylaromatic amidomethylated bead polymer s further converted into monodisperse vinylaromatic aminomethylated bead polymers. The conversion is generally effected by treating the amidomethylated monodisperse vinylaromatic bead polymer with aqueous or alcoholic solutions of an alkali metal hydroxide, such as sodium hydroxide or potassium hydroxide, at temperatures between 100° C. and 250° C., preferably at temperatures between 120° C. and 190° C. It is preferable to perform the conversion with alkali metal or alkaline earth metal hydroxides or mixtures thereof, more preferably with alkali metal hydroxides, in particular sodium hydroxide. The conversion is preferably carried out in the presence of an aqueous or alcoholic solution of an alkali metal hydroxide. The concentration of the aqueous sodium hydroxide solution is in the range from 10 to 50 wt %, preferably 20 to 40 wt %. This method provides monodisperse vinylaromatic aminomethylated bead polymers having an above 1 degree of substitution on the aromatic rings.

The monodisperse vinylaromatic aminomethylated bead polymer formed in the process of this method can be washed alkali-free with completely ion-free water.

The monodisperse vinylaromatic aminomethylated bead polymer is usable as ion exchanger. When the monodisperse vinylaromatic aminomethylated bead polymer is used as ion exchanger, it is suitable in particular for the removal of heavy metals or noble metals from aqueous solutions of alkalis or alkaline earths or their vapors from sols of the alkali-chloride electrolysis from aqueous hydrochloric acids, from wastewaters or flue gas scrubs, groundwaters, or landfill leachates, from liquid or gaseous hydrocarbons, natural gases, natural gas condensates, petroleums and also from liquid or gaseous (hydro)halocarbons. These ion exchanger uses for the monodisperse vinylaromatic aminomethylated bead polymer are likewise co-encompassed by the invention.

In addition, however, the monodisperse vinylaromatic aminomethylated bead polymer may likewise be reacted with further alkylating agents to form anion exchangers or chelating resins.

It is further possible to react the monodisperse vinylaromatic aminomethylated bead polymers of the present invention with halomethyl nitrogen heterocycles, e.g., 2-chloromethylpyridine, 3-chloromethylpyridine or 4-chloromethylpyridine, and thereby prepare chelating resins.

The method of using the monodisperse vinylaromatic aminomethylated bead polymers in the manufacture of anion exchangers and chelating resins is likewise co-encompassed by the invention.

The present Invention accordingly also provides a method of producing monodisperse anion exchangers and chelating resins which comprises
a) reacting monomer droplets formed from at least one monovinylaromatic compound and from at least one polyvinylaromatic compound and also optionally a porogen and an initiator or an initiator combination to form a monodisperse vinylaromatic bead polymer, b) swelling this monodisperse vinylaromatic bead polymer by an organic solvent and reacting it in this state with in situ prepared carbonium ions prepared by the reaction of compounds of formula (I) and at least one condensed formaldehyde in the presence of at least one protic acid, at a temperature between 55° C. and 75° C., to form the monodisperse amidomethylated vinylaromatic bead polymer, c) converting the monodisperse amidomethylated vinylaromatic bead polymer into monodisperse aminomethylated vinylaromatic bead polymer, and d) finally reacting the monodisperse amidomethylated vinylaromatic bead polymer with alkylating agent to form anion exchangers and chelating resins.

Preferred alkylating agents for the purposes of the present invention are alkyl halides, haloalcohols, alkyl sulfates, dialkyl sulfates, alkyl oxides, Leuckart-Wallach reagents or combinations thereof in between and/or in succession.

Particular preference is given to employing chloromethane, ethylene oxide, propylene oxide and also the Leuckert-Wallach reagents or their combination. Leuckart-Wallach reagents are described by way of example in Organikum, VEB Deutscher Verlag der Wissenechaften, Berlin 1968, 8th edition, page 479.

Water or mineral acids are employed as suspension medium. But optionally bases may also be added depending on the desired product. It is preferred to employ water. Aqueous sodium hydroxide solution, aqueous potassium hydroxide solution or basic but not nucleophilic amines are optionally useful as bases.

Step d) is carried out at temperatures of 20 to 150° C., preferably at temperatures of 40 to 110° C. Step d) is carried out at pressures ranging from atmospheric pressure to 6 bar, preferably ranging from atmospheric pressure to 4 bar.

The present invention further provides the monodisperse anion exchangers and chelating resins obtained by the method of the present invention.

The method of the present invention preferably provides monodisperse anion exchangers and chelating resins having the functional groups formed during step d):

where
R3 represents hydrogen, an alkyl group, a hydroxyalkyl group or an alkoxyalkyl group,
R4 represents hydrogen, an alkyl group, a hydroxyalkyl group or an alkoxyalkyl group,
R5 represents hydrogen, an alkyl group, a hydroxyalkyl group or an alkoxyalkyl group,
m represents from 1 to 5, more preferably 1, and
X represents an anionic counterion, preferably $Cl^-$, $Br^-$, $OH^-$, $NO_3^-$ or $SO_4^{2-}$.

Alkoxy and/or alkyl in the R3, R4 and R5 moieties each preferably represents from 1 to 6 carbon atoms.

In the monodisperse anion exchangers and chelating resins of the present Invention, each aromatic ring preferably bears from 0.1 to 2 of the abovementioned functional groups (III), (IV).

The anion exchangers obtained according to the present invention are employed
to remove anions from aqueous organic solutions,
to remove anions from the condensates, to remove colored particles from aqueous organic solutions, to remove organic components from aqueous solutions, for example to remove humic acids from surface water.

The anion exchangers of the present invention are further employable to purify and regenerate waters in the chemical industry and electronics industry, in particular in the production of ultrapure water.

The anion exchangers of the present invention are further employable in combination with gellike and/or macroporous cation exchangers to render aqueous solutions and/or condensates completely ion-free.

The present invention makes available a novel method of producing monodisperse amidomethylated vinylaromatic bead polymers that provides specifically phthalamidomethylated bead polymers and monodisperse aminomethylated bead polymers efficiently, taking into account ecological aspects and in high yield.

EXAMPLE 1

Preparation of Monodisperse Macroporous Bead Polymer on the Basis of Styrene, Divinylbenzene and Ethylstyrene A 10 l glass reactor is charged with 3000 g of completely ion-free water, and a solution of 10 g of gelatin, 16 g of disodium hydrogenphosphate dodecahydrate and 0.73 g of resorcinol in 320 g of completely ion-free water is added and mixed in. The mixture is equilibrated to 25° C. Subsequently, while stirring, a mixture of 3200 g of microencapsulated monomer droplets having a narrow particle size distribution, composed of 5% by weight of divinylbenzene and 1% by weight of ethylstyrene (used in the form of a commercial isomer mixture of divinylbenzene and ethylstyrene with 80% divinylbenzene), 0.4% by weight of dibenzoyl peroxide, 56.3% by weight of styrene and 37.5% by weight of isododecane (technical isomer mixture having a high proportion of pentamethylheptane) is applied, the microcapsule consisting of a formaldehyde-hardened complex coacervate composed of gelatin and a copolymer of acrylamide and acrylic acid, and 3200 g of aqueous phase having a pH of 12 are added. The mean particle size of the monomer droplets is 460 μm.

The mixture s stirred and polymerized to completion by increasing the temperature in accordance with a temperature programme beginning at 25° C. and ending at 95° C. The mixture is cooled, washed through a 32 μm sieve and then dried at 80° C. under reduced pressure. This gives 1893 g of a polymer in bead form having a mean particle size of 440 μm, narrow particle size distribution and smooth surface.

The polymer has a chalky white appearance and a bulk density of about 470 g/l.

1.1. Preparation of Monodisperse Macroporous Anion Exchanger Having Tertiary Amino Groups —$CH_2N(CH_3)_2$— Reaction at 45° C.

A monodisperse macroporous anion exchanger having aminomethyl groups —$CH_2NH_2$— is prepared here as an intermediate stage.

1.2. Preparation of Phthalimidomethylated Monodisperse Macroporous Bead Polymer

Apparatus: 4-liter four-neck flask, metering funnel, thermometer, heating bath, stirrer 1503 ml of 1,2-dichloroethane are initially charged at room temperature. 252.5 g of monodisperse macroporous bead polymer from Example 1 are metered into the initial charge. The suspension is stirred at room temperature for 2 hours. This is followed by the metered addition of 117.3 g of 91 wt % paraformaldehyde and 507.8 g of phthalimide. The suspension is heated to 45° C. At this temperature, the mixture is stirred for 0.5 hours. Within 2 hours, 677 g of sulfuric acid monohydrate are then metered in at 45° C. Subsequently, the suspension is then stirred at this temperature for 3 hours. The warm reaction broth is filtered off with suction. 2 liters of completely ion-free water are metered in. Residual amounts of 1,2-dichloroethane are removed by distillation. The mixture is then cooled and the volume of resin is determined.

Volume yield: 1350 ml

Dry weight: 0.454 g per ml of resin 1.3. Preparation of Aminomethyl-containing Monodisperse Macroporous Bead Polymer Apparatus: 4-liter autoclave, stirrer, thermometer At room temperature, 826 ml of completely ion-free water are initially charged. A mixture of 371 ml of completely ion-free water and 567 of 50 wt % aqueous sodium hydroxide is metered in. While stirring, 1330 ml of resin prepared according to example 1.1 are metered in.

The suspension is heated to 180° C. and stirred at this temperature for a further 8 hours. Thereafter, the suspension is cooled. The resultant bead polymer is removed by means of a sieve and washed to neutrality with completely ion-free water.

Volume yield: 950 ml

Projected onto overall yield of intermediate stage: 964 ml

Total base quantity formed—product of HCl number and overall yield of resin: 1822 mmol HCl number: 1.89 mol/l Delivery form: 30 ml Chloride form: 44 ml Second base form: 35 ml—these 35 ml weigh: 9.609 g First substitution: 0.81

1.4. Preparation of Dimethylamino-containing Monodisperse Macroporous Bead Polymer Apparatus: 4 liter four-neck flask, condenser, stirrer, thermometer, Dulcometer 1380 ml of completely ion-free water, 289.8 g of 36 wt % aqueous formalin solution and 920 ml of resin from Example 1.2. are initially charged at room temperature. The suspension is heated to 40° C. The pH is adjusted to pH 3 by metered addition of 85 wt % aqueous formic acid. A reaction program is then pursued as follows:

Heat to 55° C. and stir at 55° C. for a further 0.5 hours

Then heat to 70° C. and stir at 70° C. for a further 0.5 hours

Heat to 80° C. and stir at 80° C. for a further 0.5 hours

Then heat to reflux temperature—about 97° C. The pH 3 is maintained throughout the entire heating phase by metered addition of 85 wt % formic acid. On reaching reflux temperature, pH 2 is established in the course of 0.5 hours. First with the remaining formic acid, then with 96 wt % sulfuric acid. This is followed by stirring at pH 2 for 0.5 hours. pH 1 is then established. Further sulfuric acid is then metered in over 0.5 hours as required, followed by a further 10 hours of stirring under reflux. The suspension is then cooled down, and the resin is separated off via a sieve and washed with completely ion-free water.

Altogether, 207 g of 85 wt % formic acid and 266.3 g of 96 wt % sulfuric acid are metered in.

Volume yield: 1400 ml

The entire amount of resin is filled into a column and downwardly treated with 3 bed volumes of 4 wt % aqueous sodium hydroxide solution. The excess of aqueous sodium hydroxide solution is then washed off with 5 bed volumes of completely ion-free water.

Volume yield: 1050 ml
Projected onto overall yield of resin: 1100 ml
Total base quantity formed—product of HCl number and overall yield of resin: 1584 mmol
HCl number. 1.44 mol/l
Delivery form: 50 ml
Chloride form: 66 ml
Second base form: 50 ml
Resin stability 99% entire beads

EXAMPLE 2

Preparation of Monodisperse Macroporous Anion Exchanger Having Tertiary Amino Groups —$CH_2N(CH_3)_2$— reaction at 65° C.

A monodisperse macroporous anion exchanger having aminomethyl groups —$CH_2NH_2$— is prepared here as an intermediate stage.

2.1. Preparation of Phthalimidomethylated Monodisperse Macroporous Bead Polymer

Apparatus: 4-liter four-neck flask, metering funnel, thermometer, heating bath, stirrer 1503 ml of 1,2-dichloroethane are initially charged at room temperature. 252.5 g of monodisperse macroporous bead polymer from Example 1 are metered into the initial charge. The suspension is stirred at room temperature for 2 hours. This is followed by the metered addition of 117.3 g of 91 wt % paraformaldehyde and 507.8 g of phthalimide. The suspension is heated to 65° C. At this temperature, the mixture is stirred for 0.5 hours. Within 2 hours, 677 g of sulfuric acid monohydrate are then metered in at 65° C. Subsequently, the suspension is then stirred at this temperature for 3 hours. The warm reaction broth is filtered off with suction. 2 liters of completely ion-free water are metered in. Residual amounts of 1,2-dichloroethane are removed by distillation. The mixture is then cooled and the volume of resin is determined.

Volume yield: 1475 ml
Dry weight: 0.45 g per ml of resin 2.2. Preparation of Aminomethyl-Containing Monodisperse Macroporous Bead Polymer Apparatus: 4-liter autoclave, stirrer, thermometer At room temperature, 855 ml of completely ion-free water are initially charged. A mixture of 424 ml of completely ion-free water and 649 g of 50 wt % aqueous sodium hydroxide is metered in. While stirring, 1455 ml of resin prepared according to example 2.1 are metered in.

The suspension is heated to 180° C. and stirred at this temperature for a further 8 hours. Thereafter, the suspension is cooled. The resultant bead polymer is removed by means of a sieve and washed to neutrality with completely ion-free water.

Volume yield: 1050 ml
Projected onto overall yield of intermediate stage: 1064 ml
Total base quantity formed—product of HCl number and overall yield of resin: 2288 mmol
HCl number: 2.15 mol/l
Delivery form: 30 ml
Chloride form: 43 ml
Second base form: 34 ml—these 34 ml weigh: 9.016 g
First substitution: 0.98

2.3. Preparation of Dimethylaminomethyl-containing Monodisperse Macroporous Bead Polymer Apparatus: 4 liter four-neck flask, condenser, stirrer, thermometer, Dulcometer 1530 ml of completely ion-free water, 365.5 g of 36 wt % aqueous formalin solution and 1020 ml of resin from Example 2.2. are initially charged at room temperature. The suspension is heated to 40° C. The pH is adjusted to pH 3 by metered addition of 85 wt % aqueous formic acid. A reaction program is then pursued as follows:

Heat to 55° C. and stir at 55° C. for a further 0.5 hours
Then heat to 70° C. and stir at 70° C. for a further 0.5 hours
Heat to 80° C. and stir at 80° C. for a further 0.5 hours
Then heat to reflux temperature—about 97° C. The pH 3 is maintained throughout the entire heating phase by metered addition of 85 wt % formic acid. On reaching reflux temperature, pH 2 is established in the course of 0.5 hours. First with the remaining formic acid, then with 96 wt % sulfuric acid. This is followed by stirring at pH 2 for 0.5 hours. pH 1 is then established. Further sulfuric acid is then metered in over 0.5 hours as required, followed by a further 10 hours of stirring under reflux. The suspension is then cooled down, and the resin is separated off via a sieve and washed with completely ion-free water.

Altogether, 261.1 g of 85 wt % formic acid and 335.8 g of 96 wt % sulfuric acid are metered in.

Volume yield: 1525 ml

The entire amount of resin is filled into a column and downwardly treated with 3 bed volumes of 4 wt % aqueous sodium hydroxide solution. The excess of aqueous sodium hydroxide solution is then washed off with 5 bed volumes of completely ion-free water.

Volume yield: 1180 ml
Projected onto overall yield of resin: 1231 ml
Total base quantity formed—product of HCl number and overall yield of resin: 2066 mmol
HCl number: 1.678 mol/l
Delivery form: 50 ml
Chloride form: 65 ml
Second base form: 50 ml
Resin stability: 99% entire beads Table 3 presents a comparison of the characteristic data of the resins obtained in Examples 1 and 2.

TABLE 3

| Example/ reaction temperature in ° C. | Yield of phthalimidomethylated bead polymer in ml | Yield of aminomethylated bead polymer in ml | Total base quantity at the level of the aminomethylated bead polymer in mmol | First substitution | Yield of dimethylaminomethylated bead polymer in ml | Total base quantity at the level of the dimethylaminomethylated bead polymer in mmol | HCl - number of dimethylaminomethylated bead polymer in mol/liter of resin |
|---|---|---|---|---|---|---|---|
| 1/45° C. | 1350 | 964 | 1822 | 0.81 | 1100 | 1584 | 1.44 |
| 2/65° C. | 1475 | 1064 | 2288 | 0.98 | 1231 | 2066 | 1.678 |

Test Methods:

Number of Perfect Beads as Obtained 100 beads are inspected under a microscope. The number of beads which are cracked or splintered is counted. The number of perfect beads is 100 minus the number of damaged beads.

Volume Difference Chloride/OH Form

Completely ion-free water is used to wash 100 ml of anion exchanger bearing basic groups into a glass column. 1000 ml of 3 wt % hydrochloric acid are passed through the column in the course of 1 hour and 40 minutes. The resin is then washed chloride-free with completely ion-free water. The resin is washed into a tamp volumeter under completely ion-free water and agitated to constant volume—volume V 1 of resin in chloride form.

The resin is transferred back into the column. 1000 ml of 2 wt % aqueous sodium hydroxide solution are passed through the column. The resin is then washed alkali-free with completely ion-free water until the eluate is at pH 8. The resin is washed into a tamp volumeter under completely ion-free water and is agitated to constant volume—volume V2 of resin in the free base form (OH form).

Computation: $V1-V2=V3$ $V3:V1/100$=swelling difference chloride/OH form in %

Determination of Amount of Basic Aminomethyl Groups in Aminomethylated Crosslinked Polystyrene Bead Polymer—HCl Number 100 ml of the aminomethylated bead polymer are agitated down in the tamp volumeter and subsequently washed with completely ion-free water into a glass column. 1000 ml of 2 wt % aqueous sodium hydroxide solution are passed through the column in the course of 1 hour and 40 minutes. Completely ion-free water is then passed through until 100 ml of phenolphthalein admixed eluate have a consumption of 0.1 N (0.1 normal) hydrochloric acid of not more than 0.05 ml.

50 ml of this resin are admixed in a glass beaker with 50 ml of completely ion-free water and 100 ml of 1N hydrochloric acid. The suspension is stirred for 30 minutes and then filled into a glass column. The liquid is drained off. A further 100 ml of 1N hydrochloric acid are passed through the resin for 20 minutes. 200 ml of methanol are then passed through. All the eluates are collected and combined and titrated with 1N aqueous sodium hydroxide solution against methyl orange.

The number of aminomethyl groups in 1 liter of aminomethylated resin computes according to the following formula: $(200-V)\cdot 20$=mol of aminomethyl groups per liter of resin.

Determination of Degree of Aminomethyl Substitution on Aromatic Rings of Crosslinked Bead Polymer The number of aminomethyl groups in the total amount of aminomethylated resin is determined by the above procedure.

The amount of employed bead polymer—A in grams—is divided by the molecular weight to compute the molar amount of aromatics which is present in this amount.

For example, 300 g of bead polymer are converted into 950 ml of aminomethylated bead polymer having 1.8 mol/l of aminomethyl groups.

950 ml of aminomethylated bead polymer contain 2.82 mol of aromatics.

So 1.8/2.81=0.64 mol of aminomethyl groups is present per aromatic.

The degree of aminomethyl substitution on the aromatic rings of the crosslinked bead polymer is 0.64.

What is claimed is:

1. A one-pot method for producing monodisperse amidomethylated vinylaromatic bead polymers, the method comprising contacting:
    at least one monodisperse vinylaromatic bead polymer;
    at least one compound of formula (I) or salts thereof

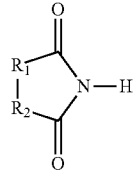

(I)

where
    $R_1$=—CH($C_1$-$C_6$-alkyl)- or —$CH_2$—, and $R_2$=—CH—($C_1$-$C_6$-alkyl)- or —$CH_2$—, or
    $R_1$ and $R_2$ combine to form a $C_6$-$C_{14}$-arylene, or
    $R_1$ and $R_2$ together represent —CH=CH—; and
    at least one condensed formaldehyde, wherein the at least one condensed formaldehyde comprises paraformaldehyde, or trioxane, or mixtures thereof, together in a one-pot process in the presence of at least one protic add and at least one organic solvent at a temperature of 55° C. to 75° C. to produce monodisperse amidomethylated vinylaromatic bead polymers.

2. The method as claimed in claim 1, wherein the temperature is 62° C. to 68° C.

3. The method as claimed in claim 1, wherein the at least one protic acid comprises sulfuric acid, hydrochloric acid, oleum, or mixtures thereof.

4. The method as claimed in claim 1, wherein the at least one organic solvent comprises chlorinated aliphatic hydrocarbons.

5. The method as claimed in claim 4, wherein the ratio of solvent to compound of formula (I) is 5.5:1 to 8.5:1.

6. The method as claimed in claim 1, wherein the at least one organic solvent comprises chlorinated $C_1$-$C_6$-alkanes.

7. The method of claim 1, wherein $R_1$ and $R_2$ together form phenylene, optionally substituted by $C_1$-$C_4$-alkyl.

8. The method of claim 1, wherein the compounds of formula (I) are phthalimide, succinimide or maleimide.

9. The method of claim 1, wherein the compounds of formula (I) are phthalimide.

10. The method as claimed in claim 1, wherein:
    the temperature is 62° C. to 68° C.;
    the compounds of formula (I) are phthalimide, succinimide or maleimide;
    the at least one protic acid is sulfuric acid, hydrochloric acid, oleum, or mixtures thereof;
    the at least one organic solvent is a chlorinated $C_1$-$C_6$-alkene;
    a ratio of the at least one organic solvent to the compounds of formula (I) is 5.5:1 to 8.5:1; and
    the at least one condensed formaldehyde is paraformaldehyde, trioxane, or mixtures thereof.

11. A monodisperse amidomethylated vinylaromatic bead polymer produced by the process of claim 1.

* * * * *